United States Patent
Moisio

(10) Patent No.: US 6,494,081 B1
(45) Date of Patent: Dec. 17, 2002

(54) METHOD OF MEASURING PROPERTIES OF PAPER, AND ARRANGEMENT IN A PAPER MEASURING APPARATUS

(75) Inventor: Hannu Moisio, Kangasala (FI)

(73) Assignee: Metso Paper Automation Oy, Tampere (FI)

( * ) Notice: Subject to any disclaimer, the term of this patent is extended or adjusted under 35 U.S.C. 154(b) by 0 days.

(21) Appl. No.: 09/622,985
(22) PCT Filed: Feb. 25, 1999
(86) PCT No.: PCT/FI99/00147
 § 371 (c)(1),
 (2), (4) Date: Aug. 25, 2000
(87) PCT Pub. No.: WO99/44014
 PCT Pub. Date: Sep. 2, 1999

(30) Foreign Application Priority Data

Feb. 26, 1998 (FI) .................................................. 980442

(51) Int. Cl.⁷ ............................. G01B 13/04; G01L 5/04
(52) U.S. Cl. ........................... 73/37.7; 73/159; 324/231
(58) Field of Search .................. 73/37.7, 159; 324/229, 324/231; 162/198

(56) References Cited

U.S. PATENT DOCUMENTS

| 2,940,040 A | * | 6/1960 | Rosenthal ..................... 73/159 |
| 3,494,177 A | * | 2/1970 | Eckerlin ...................... 73/37.7 |
| 3,528,002 A | * | 9/1970 | Dunlavey .................... 324/231 |
| 3,855,524 A | | 12/1974 | Crawford |
| 4,107,606 A | | 8/1978 | Typpo et al. |
| 4,292,838 A | * | 10/1981 | Larsen ........................ 73/37.7 |
| 4,450,404 A | | 5/1984 | Williams et al. |
| 4,528,507 A | | 7/1985 | Domin et al. |
| 4,581,918 A | * | 4/1986 | Duhrin ........................ 73/37.7 |
| 4,647,855 A | | 3/1987 | Berglund |
| 4,929,895 A | * | 5/1990 | Typpo ........................ 324/231 |
| 5,865,059 A | * | 2/1999 | Alessandro ................... 73/159 |

FOREIGN PATENT DOCUMENTS

| DE | 40 11 646 A1 | 10/1991 |
| GB | 2 132 354 A | 7/1984 |
| WO | WO 95/30877 A1 | 11/1995 |
| WO | WO 96/35112 A1 | 11/1996 |

OTHER PUBLICATIONS

PCT International Search Report, PCT/FI99/00147, completed on Jul. 12, 1999.
Copy of Finnish Official Action, Appl. No. 980442, dated Nov. 23, 1998.

* cited by examiner

Primary Examiner—Hezron Williams
Assistant Examiner—Michael Cygan
(74) Attorney, Agent, or Firm—Alston & Bird LLP

(57) ABSTRACT

A measuring probe in a paper measuring apparatus is kept at a distance from the surface of the paper by feeding medium between the paper and a surface of the measuring probe through a feed hole in the surface of the measuring probe. The pressure of the supplied medium, the dimensions of the feed hole and measuring probe, and the distance of the probe surface from the paper are arranged such that after the medium is discharged from the feed hole, the rate of the flowing medium increases so as to produce an underpressure, which generates a force tending to move the paper and the measuring probe toward each other. The discharge of the medium from the feed hole produces an opposite force urging the paper and probe away from each other, and the measuring probe and paper settle in a state of equilibrium determined by the two forces.

17 Claims, 3 Drawing Sheets

METHOD OF MEASURING PROPERTIES OF PAPER, AND ARRANGEMENT IN A PAPER MEASURING APPARATUS

FIELD OF THE INVENTION

The invention relates to a method of measuring properties of paper, the method comprising measuring properties of paper with an apparatus comprising at least one measuring probe having a feed hole substantially symmetrically placed in the center of the measuring probe, medium being fed between the measuring probe and the paper via the feed hole.

The invention further relates to an arrangement in a paper measuring apparatus, the arrangement comprising at least one measuring probe, a sensor arranged in connection with the measuring probe, a feed hole arranged substantially symmetrically in the center of the measuring probe, and means for feeding medium between the measuring probe and the paper through the feed hole.

BACKGROUND OF THE INVENTION

In a paper machine, the thickness and other properties of paper and cardboard are typically continuously monitored as the paper is moving. Apparatuses are usually fastened to what is known as a measuring beam, in which the apparatuses continuously move in a reciprocating manner in the transverse direction of the paper and continuously measure the paper as it moves forward. Sensors are arranged as close to the surface of the paper as possible to improve measuring accuracy. This causes a plurality of problems, e.g. if the measuring sensors for some reason come into contact with the surface of the paper, the sensors may leave tracks on the paper. Furthermore, the contact may cause fouling of measuring heads, resulting in impaired measuring accuracy in the long run. The contact of the sensors with the irregularities of the surface of the paper may also cause roles to be formed in the paper. Consequently it is known to use what is known as on air bearing, the sensors being provided with a bored hole or holes through which air is blown between the sensor and the paper web. Owing to the air bearing, the sensor is able to stay away from the web, and hence e.g. irregularities on the surface of the paper do not come into contact with the measuring head. This avoids formation of holes in the paper. Formation of traces on the surface of the paper is also avoided and fouling of the sensors diminishes. Such air bearing solutions are disclosed in e.g. German Offenlegungsschrift 28 29 264 and 40 11 646 and in U.S. Pat. Nos. 4,450,404 and 4,528,507 and in WO 95/30877. It is common to all these solutions that air is blown either from a plurality of apertures or at a high pressure or from a large area or in some other way, ensuring that the quantity of air keeps the measuring head away from the surface of the paper. However, said solution does not ensure at a sufficient accuracy that the gap between the measuring head and the paper remains constant, and thus the measuring accuracy does not remain sufficiently high. U.S. Pat. No. 3,855,524 discloses a solution corresponding to the above publications, with the exception that air jets are directed inclined towards the edges of the sensor to prevent the sensor from tilting. However, the problems with measuring accuracy are identical to those in the above publications.

WO 96/35112 discloses a sensor provided with an asymmetrically arranged opening from which air is blown between the sensor and the paper. Around the opening, close to it, is a circular channel into which the air between the sensor and the paper flows through the opening. The circular channel is in communication with a discharge channel via which the air blown to the circular channel is led out. Other means are used to blow air into the discharge channel to provide an ejector effect to increase the stream velocity of the air flowing in the circular channel. An increase in the stream velocity reduces the pressure in the portion inside the circular channel below ambient. The solution is extremely complex and the flow resistances can easily cause failure of achieving the underpressure. The apparatus is difficult to manufacture, and e.g. the discharge channel can absorb dust, making the apparatus extremely difficult to maintain.

It is an object of the present invention to provide an arrangement which avoids the above drawbacks.

SUMMARY OF THE INVENTION

The method of the intention is characterized in that medium is fed to produce a force which keeps the measuring probe at a distance from the surface of the paper, the diameter of the feed hole, the diameter of the measuring probe, the distance between the measuring probe and the paper, and the pressure for feeding the medium being arranged such that when the medium is discharged from the feed hole, the flow rate of the medium increases so that the flow produces underpressure which generates a force between the paper and the measuring probe, which force tends to move the measuring probe and the paper towards one another, whereby they are set in a state of equilibrium determined by said forces.

The arrangement of the invention is characterized in that at a given pressure for feeding medium the diameter of the feed hole, the diameter of the measuring probe and the distance between the measuring probe and the paper are arranged such that when the medium is discharged from the feed hole, the flow rate increases so that the flow produces underpressure which generates a force between the paper and the measuring probe, which force tends to move the measuring probe and the paper towards one another, thus keeping them close to one another, whereby the measuring probe and the paper are set in a state of equilibrium with respect to their mutual distance.

It is an essential idea of the invention that the measuring probe of the measuring apparatus is kept at a distance from the surface of the paper by a feeding medium, preferably air, through the measuring probe, between the measuring probe and the paper so as to adjust the measuring probe and the paper in a state of equilibrium with respect to their mutual distance. It is a further idea that the pressure of the medium to be fed, the dimensions of the feed hole and the measuring probe and their distance from the surface of the paper are arranged in such a way that after the medium is discharged from the feed hole, its flow rate increases so as to produce underpressure which generates a force between the paper and the measuring probe, which force tends to move them towards one another. On the other hand, the feeding of the medium generates a force between the measuring probe and the paper forcing them away from one another, whereby the measuring probe and the paper settle in a state of equilibrium determined by said forces.

It is an advantage of the invention that the measuring probe and the paper can be set in such a state of equilibrium that the distance between them is extremely accurate and remains constant. Furthermore, a gap remains between the measuring probe and the paper, whereby the irregularities on the surface of the paper do not come into contact with the measuring head, and holes are not formed in the paper.

Traces are not formed on the surface of the paper and fouling of the sensor can be kept relatively slight.

In addition to paper, the term paper refers herein also to cardboard.

BRIEF DESCRIPTION OF THE FIGURES

The invention will be described in greater detail in the attached drawings, wherein.

DETAILED DESCRIPTION OF THE PREFERRED EMBODIMENTS

Figure 1:
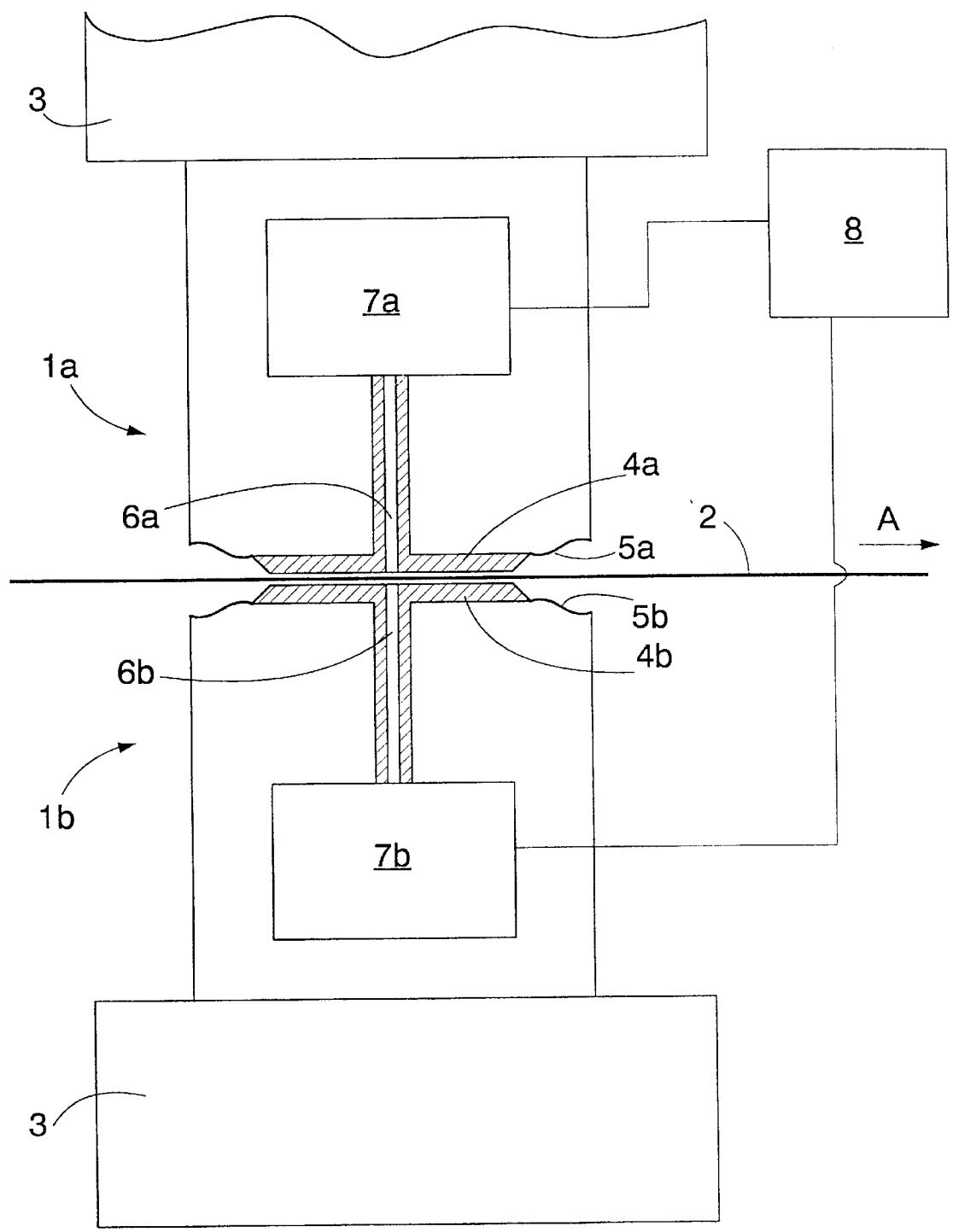
FIG. 1 is a schematic partially sectional side view of an arrangement of the invention.

FIG. 1 shows an apparatus comprising a first measuring head 1a and a second measuring head 1b, paper 2 being arranged between them. The paper moves n the machine direction in accordance with arrow A. The first measuring head 1a and the second measuring head 1b are arranged in what is called a measuring beam 3. in which the measuring heads 1a and 1b traverse substantially continuously in a direction transverse to the machine direction. Properties of the paper are measured substantially continuously as the paper moves forward. A first measuring probe 4a is arranged in the first measuring head 1a and a second measuring probe 4b is arranged in the second measuring head 1b. A coil, for instance, can be arranged in the first measuring probe 4a, and e.g. a plate made from a suitable material can De arranged in the second measuring probe 4b, whereby the distance between the measuring probes 4a and 4b can be determined by the apparatus in a manner known per se. The sensors in the measuring probes 4a and 4b can have any structure known per so, so as to allow determination of the caliper or another property of the paper, the caliper being determined for example from the distance between the measuring probes. Furthermore, the measuring probe 4a and the sensor can be integrated to form one body. Different sensors and the use thereof in measuring properties of paper are obvious to persons skilled in the art, and are therefore not dealt with in any greater detail herein or in the attached figures.

The first measuring probe 4a is fastened to the first measuring head 1a by a flexible membrane 5a, the second measuring probe 4b is similarly fastened to the second measuring head 1b by a flexible membrane 5b. The flexible membranes 5a and 5b allow the measuring probes 4a and 4b to move towards one another or away from one another as e.g. the caliper of the paper 2 varies. The location of the measuring probes 4a and 4b with respect to the paper 2 can also be adjusted by membrane actuators provided In the measuring heads 1a and 1b, the actuators not being shown in the attached figure for the sake of clarity.

The first measuring probe 4a is provided with a feed hole 6a via which medium is fed between the measuring probe 4a and the paper 2. The second measuring prose 4b is similarly provided with a feed hole 6b, via which medium is fed between the second measuring probe 4b and the paper 2. The medium is preferably a gaseous substance, most preferably air. The medium is fed by means of air feeders, e.g. fens 7a and 7b. For the sake of clarity, valves employed in feeding pressurized air are not shown in the figure.

The apparatus further comprises a control unit 8 for e.g. controlling the fans 7a and 7b or adjusting the pressure in some other manner. The control unit 8 can also be used to collect measuring data from the measuring sensors.

Figure 2:
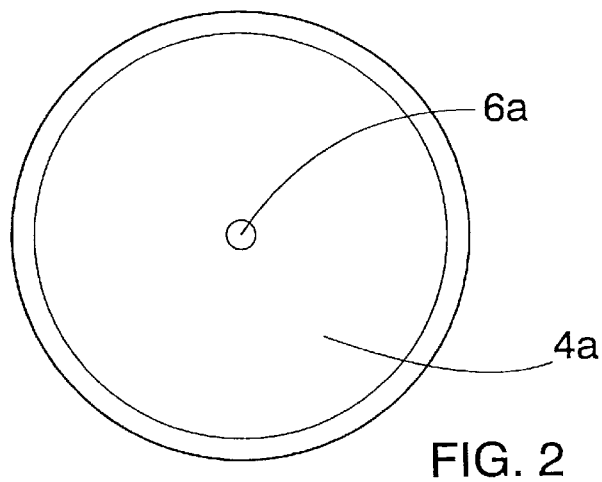
FIG. 2 is a schematic view of a measuring probe of the invention seen from below.

FIG. 2 shows the measuring probe 4a seen from below. The feed hole 6a is arranged substantially symmetrically in the center of the measuring probe 4a such that the feed hole 6a is surrounded by a sufficient area of even measuring probe 4a surface which is to settle towards the paper 2. The shape of the measuring probe may be other than a circle shown in the figure, e.g. a triangle, rectangle etc.

Figure 3:
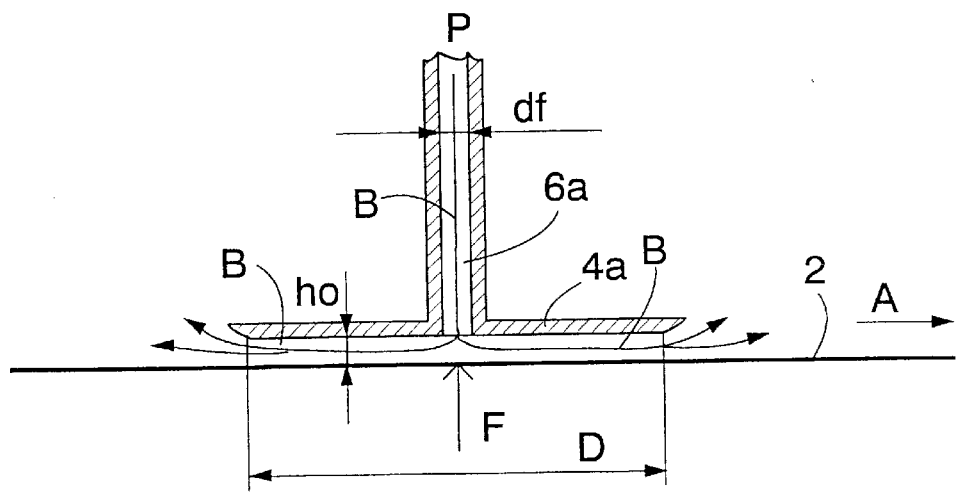
FIG. 3 is a sectional side view of the measuring probe of FIG. 2.

FIG. 3 is a sectional side view of the measuring probe 4a. Medium flowing in accordance with arrows B is fed between the measuring probe 4a and the paper 2 via the feed hole 6a. The medium is fed from the feed hole 6a at a steep angle with respect to the surface of the paper 2, the angle being preferably about 90°. The pressure P of the medium to be fed preferably varies between 10 kPa and 600 kPa. A typically used pressure is 100 kPa. The diameter df of the feed hole 6a and the gap ho between the measuring probe 4a and the paper 2 are dimensioned such that the flow rate of the medium increases as it is discharged between the measuring probe 4a and the paper 2 from the feed hole 6a to such a degree that the flow creates underpressure between the measuring probe 4a and the paper 2, whereby a force F is created between the measuring probe 4a and the paper 2, the force tending to move the measuring probe 4a and the paper 2 towards one another. On the other hand, the medium flow creates a force which keeps the paper 2 and the measuring probe 4a apart, whereby the measuring probe 4a and the paper 2 settle in a substantially constant state of equilibrium with respect to one another. The point of equilibrium can naturally be affected by an external force, such as a membrane actuator adjusting the position of the measuring probe 4a, but external forces are naturally kept substantially constant during measurement. The gap between the measuring probe 4a and the paper 2 preferably exceeds 5 micrometers, since the roughness of the surface of paper is typically approximately within this range. In order to produce sufficient under-pressure by the change in flow rate, the ratio between the diameter df of the feed hole and the gap ho between the measuring probe 4a and the paper 2 should preferably be $$df/(4*ho)>2.$$

A typical value for the gap ho between the measuring probe 4a and the paper 2 is 60 micrometres. For the sake of clarity, in FIG. 3 the gap ho between the measuring probe 4a and the paper 2 is shown significantly larger than in a normal situation.

Furthermore, it is essential to the operation of the invention that the ratio between the diameter df of the feed hole 6a and the diameter D of the measuring probe 4a is suitable. In this context, the diameter D of the measuring probe refers to the diameter of that portion of the measuring probe 4a which at the moment of measurement is substantially parallel to the paper 2 to be measured and at whose edges the medium is discharged from between the paper 2 and the measuring probe 4a as is shown in FIG. 3. The medium is discharged from between the paper 2 and the measuring probe 4a to a free space. The ratio between the diameter df of the feed hole 6a and the diameter D of the measuring probe 4a may vary between 0.01 and 0.25, preferably df/D<0.1. A typical value for the diameter D of the measuring probe 4a is 20 mm, but the value of diameter D may be as much as 100 mm. If the diameter D of the measuring probe 4a is 20 mm, the diameter df of the feed hole would typically be between 1 and 1.5 mm. If the diameter D of the measuring probe 4a is about 20 mm, then the diameter df of the feed hole 6a may vary between 0.2 and 5 mm.

FIG. 3 also shows how the outer edge of the measuring probe 4a is designed such that air can more easily be discharged from under the measuring probe 4a to the space surrounding it. The edge of the measuring probe 4a is upwardly curved. This shape allows air discharge to slow down smoothly, As a result, the force between the paper 2 and the measuring probe 4a increases and the measuring probe 4a remains better in a state of equilibrium with respect to the paper 2. When a plurality of measuring probes 4a shown in FIG. 5 are used, this shape also allows them to be arranged relatively close to each other.

Figure 4:
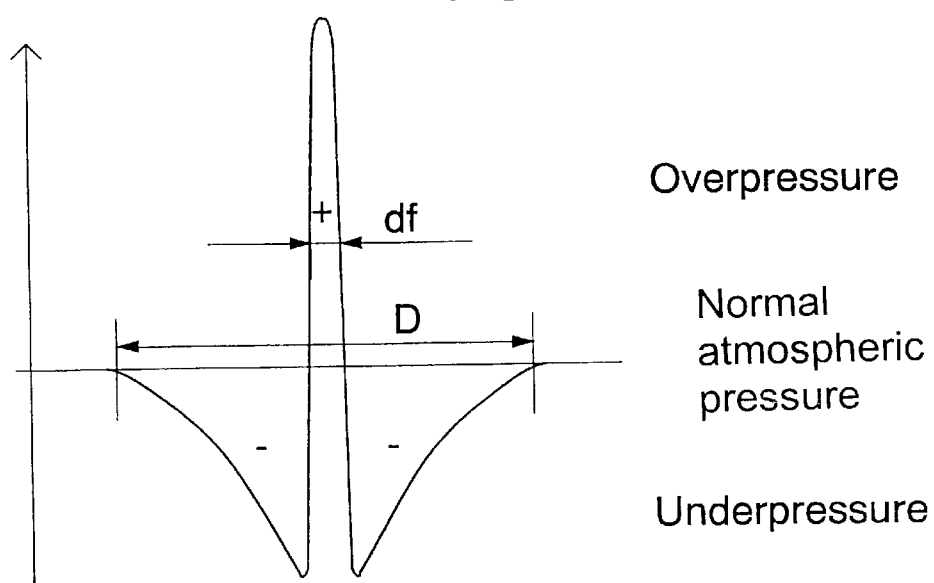
FIG. 4 shows variations in pressure generated by the solution of FIG. 3, FIG. 5 schematically shows a measuring probe solution of the arrangement of the invention seen from below.

FIG. 4 shows variations in pressure generated by the solution of FIG. 3. In FIG. 4 the horizontal axis represents the level of normal atmospheric pressure. At the feed hole 6a, the pressure of the medium to be fed is higher than normal atmospheric pressure. However, in the solution of the invention, the increase in the flow velocity of the medium generates underpressure between the feed hole 6a and the outer edge of the measuring probe 4a. This underpressure is to be sufficiently high in order for the effect of force caused by it to be higher than the effect of force of the overpressure by the feed hole 6a.

Figure 5:
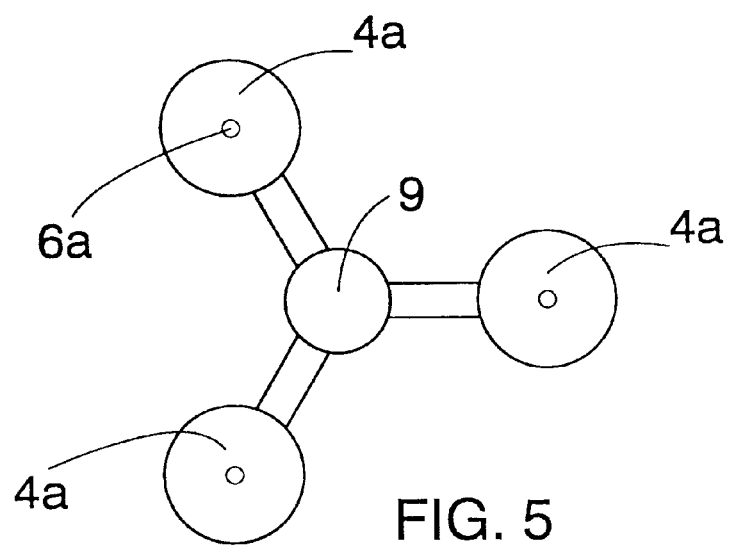
Figure 6:
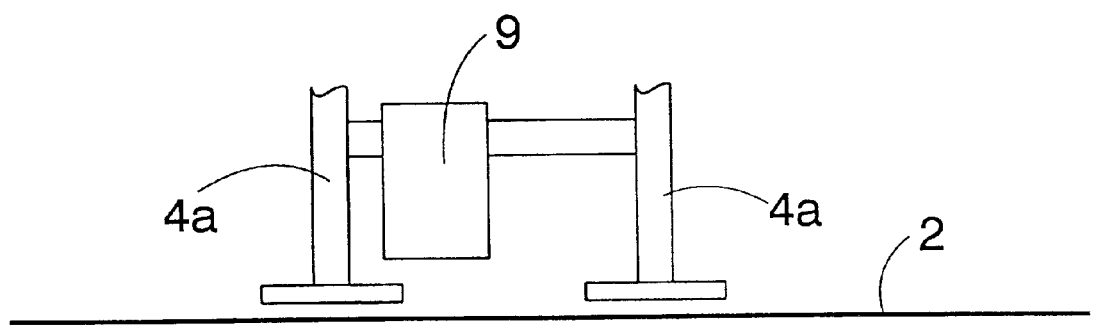
FIG. 6 is a side view of the solution of FIG. 5

FIG. 5 shows from below an arrangement of the invention comprising a plurality of measuring probes 4a. When a plurality of measuring probes 4a are used, they are to be placed at sufficient distances from each other in order for the flow of medium of one measuring probe 4a not to disturb the flow of medium of another measuring probe 4a. Furthermore, a sensor 9 is preferably arranged in the center of symmetry of the measuring probes 4a or close to it. By means of a plurality of measuring probes 4a the measuring apparatus can be very well balanced. The sensor 9 is naturally also arranged not to be in contact with the surface of the paper 2. FIG. 6 is a side view of the solution of FIG. 5.

The drawings and the related description are intended only to illustrate the inventive idea. The details of the invention may vary within the scope of the claims. In principle, the arrangement of the invention can be used in any apparatus measuring properties of paper, but the invention is particularly suited to measuring the caliper of paper, since the measuring probes can be accurately kept at a given distance from the surface of the paper. The arrangement of the invention is also suitable for use when the paper to be measured is not moving.

What is claimed is:

1. An arrangement for measuring a property of a traveling paper web, the arrangement comprising:
   a measuring head for attachment to a measuring beam located proximate and spaced from the paper web;
   at least one sensor;
   at least one measuring probe attached to the sensor such that the measuring probe and sensor form a unit, said unit being arranged in the measuring head such that the measuring probe has a surface facing the paper web that defines a measuring probe diameter (D), the measuring probe further defining a feed hole positioned substantially symmetrically in the center of the measuring probe surface and facing the paper web, said feed hole defining a feed hole diameter (df), whereby medium fed at a feed pressure through the feed hole creates a first force against the paper web, which first force keeps the measuring probe at a distance (ho) from the paper web and then between the measuring probe surface and the paper web, which creates an underpressure when the flow rate of the medium increases thereby generating a second force which tends to move the measuring probe and the paper web towards one another, wherein the ratio between the diameter of the feed hole (df) and the diameter of the measuring probe surface (D) is between 0.01 and 0.25 such that the distance (ho) between the measuring probe surface and the paper web is balanced in equilibrium determined by said forces; and
   a flexible arrangement connected between said unit of the sensor and measuring probe and the measuring head, the arrangement allowing said unit to move within the measuring head in response to changes in caliper of the traveling paper web.

2. An arrangement as claimed in claim 1 wherein the feed pressure for feeding the medium is between 10 and 600 kPa.

3. An arrangement as claimed in claim 1 wherein the ratio between the diameter of the feed hole (df) and the diameter of the measuring probe surface (D) is below 0.1.

4. An arrangement as claimed in claim 1 wherein the ratio between the diameter of the feed hole (df) and the distance (ho) between the measuring probe surface and the paper surface is defined by $df/(4*ho)>2$.

5. An arrangement as claimed in claim 1 wherein the surface of the measuring probe around the feed hole is substantially planar.

6. An arrangement as claimed in claim 1 wherein the apparatus is arranged to measure the caliper of the paper.

7. An arrangement as claimed in claim 1 wherein the feed hole is arranged to feed the medium between the measuring probe surface and the paper surface at a 90π angle with respect to the paper surface.

8. An arrangement as claimed in claim 1 wherein the medium is a gaseous substance.

9. An arrangement as claimed in claim 8 wherein the medium is air.

10. A method of measuring properties of a traveling paper web, the method comprising:
    positioning a measuring head proximate to and spaced from the traveling paper web;
    disposing a unit movably within the measuring head, said unit comprising a measuring probe defining a measuring probe diameter (D) and a sensor attached to the measuring probe;
    flowing a medium at a feed pressure through a feed hole in the measuring probe surface, the feed hole defining a feed hole diameter (df), thereby creating a first force against the paper web with the flow of medium from the feed hole, which first force keeps the measuring probe at a distance from the paper web;
    redirecting the flow of medium in a direction between the measuring probe surface and the paper web and increasing the flow rate of the medium, thereby creating an underpressure which generates a second force which tends to move the measuring probe and the paper web towards one another;
    balancing the distance (ho) determined by said forces between the measuring probe surface and the paper surface in equilibrium by providing a ratio between the diameter of the feed hole (df) and the diameter of the measuring probe surface (D) of between 0.01 and 0.25; and connecting the unit of the measuring probe and sensor to the measuring head by a flexible arrangement, the arrangement allowing the unit of the measuring probe and sensor to move within the measuring head in response to changes in caliper of the traveling paper web.

11. A method as claimed in claim 10 wherein said flowing step occurs at a medium feeding pressure of between 10 and 600 kPa.

12. A method as claimed in claim 10 wherein said balancing step is achieved by providing a ratio between the diameter (df) of the feed hole and the diameter (D) of the measuring probe of below 0.1.

13. A method as claimed in claim 10 wherein said balancing step is achieved by providing a ratio between the diameter (df) of the feed hole and the distance (ho) between the measuring probe surface and the paper surface that is defined by df/(4*ho)>2.

14. A method as claimed in claim 10 wherein the surface of the measuring probe around the feed hole is substantially planar.

15. A method as claimed in claim 10 further comprising measuring the caliper of the paper.

16. A method as claimed in claim 10 wherein said redirecting step further comprises feeding the medium between the measuring probe surface and the paper surface at a 90° angle with respect to the flow through the feed hole.

17. A method as claimed in claim 10 wherein said flowing step comprises flowing a gaseous substance.

* * * * *

UNITED STATES PATENT AND TRADEMARK OFFICE
CERTIFICATE OF CORRECTION

PATENT NO.    : 6,494,081 B1
DATED         : December 17, 2002
INVENTOR(S)   : Moisio It is certified that error appears in the above-identified patent and that said Letters Patent is hereby corrected as shown below:

Column 1,
Line 38, "roles" should read -- holes --;
Line 40, "on" should read -- an --;
Line 58, begin new paragraph with "U.S. Pat. No. 3,855,524".

Column 2,
Line 18, "intention" should read -- invention --.

Column 3,
Line 27, "n" should read -- in --;
Line 38, "De" should read -- be --;
Line 43, "per so" should read -- per se --;
Line 60, "In" should read -- in --.

Column 4,
Line 2, "fens" should read -- fans --.

Column 6,
Line 35, "90π" should read -- 90° --.

Signed and Sealed this

Seventeenth Day of June, 2003

JAMES E. ROGAN
*Director of the United States Patent and Trademark Office*